US009621801B2

United States Patent
Haga

(10) Patent No.: US 9,621,801 B2
(45) Date of Patent: Apr. 11, 2017

(54) IMAGING APPARATUS TO CONTROL ROTATION OF AN IMAGE CAPTURING DEVICE

(71) Applicant: CANON KABUSHIKI KAISHA, Tokyo (JP)

(72) Inventor: Minoru Haga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/712,643

(22) Filed: May 14, 2015

(65) Prior Publication Data

US 2015/0341554 A1  Nov. 26, 2015

(30) Foreign Application Priority Data

May 21, 2014 (JP) .................................. 2014-105361

(51) Int. Cl.
*H04N 5/232* (2006.01)
*H04N 7/18* (2006.01)

(52) U.S. Cl.
CPC ......... *H04N 5/23238* (2013.01); *H04N 5/232* (2013.01); *H04N 7/18* (2013.01); *H04N 7/183* (2013.01)

(58) Field of Classification Search
CPC ...... H04N 5/23238; H04N 7/18; H04N 7/183; H04N 5/232
See application file for complete search history.

(56) References Cited

U.S. PATENT DOCUMENTS

| 5,801,770 A * | 9/1998 | Paff ................... G08B 13/19619 348/143 |
| 2012/0206604 A1 * | 8/2012 | Jones .................... H04N 5/2251 348/159 |
| 2015/0022680 A1 * | 1/2015 | Idaka .................. H04N 5/23206 348/211.4 |
| 2015/0304532 A1 * | 10/2015 | Bart ..................... H04N 5/2252 348/373 |

FOREIGN PATENT DOCUMENTS

JP  2003-008973 A  1/2003

* cited by examiner

*Primary Examiner* — Albert Cutler
(74) *Attorney, Agent, or Firm* — Canon U.S.A., Inc. IP Division

(57) ABSTRACT

An imaging apparatus to communicate with an external apparatus via a network includes an image capturing unit, a rotation unit, a reception unit, first and second control units, a determination unit, and a control switching unit. The rotation unit rotates the image capturing unit in a predetermined direction. The reception unit receives a control command including information for designating acceleration when the rotation unit rotates the image capturing unit. The first control unit controls the rotation unit at the designated acceleration. The second control unit controls the rotation unit at acceleration that is different from the designated acceleration. The determination unit determines whether a speed at which the rotation unit rotates the image capturing unit is within a predetermined range. The control switching unit switches between the first control unit and the second control unit according to a determination result of the determination unit, and control the rotation unit.

20 Claims, 13 Drawing Sheets

FIG. 10

GetConfigurationOptions REQUEST

```
<s:Header/>
<s:Body xmlns:xsi="http://www.w3.org/2001/XMLSchema-instance" xmlns:xsd="http://www.w3.org/2001/XMLSchema">
  <GetConfigurationOptions xmlns="http://www.onvif.org/ver20/ptz/wsdl">
    <ConfigurationToken>0</ConfigurationToken>
  </GetConfigurationOptions>
</s:Body>
```

FIG. 11

```
<s:Body>
    <tptz1:GetConfigurationOptionsResponse>
        <tptz1:PTZConfigurationOptions PTZRamps="0 1 2 3">
            <tptz2:Spaces>
                <tptz2:AbsolutePanTiltPositionSpace>
                    <tptz2:URI>http://www.onvif.org/ver10/tptz/PanTiltSpaces/PositionGenericSpace</tptz2:URI>
                    <tptz2:XRange>
                        <tptz2:Min>-1.000000</tptz2:Min>
                        <tptz2:Max>1.000000</tptz2:Max>
                    </tptz2:XRange>
                    <tptz2:YRange>
                        <tptz2:Min>-1.000000</tptz2:Min>
                        <tptz2:Max>1.000000</tptz2:Max>
                    </tptz2:YRange>
                </tptz2:AbsolutePanTiltPositionSpace>
                <tptz2:AbsoluteZoomPositionSpace>
                    <tptz2:URI>http://www.onvif.org/ver10/tptz/ZoomSpaces/PositionGenericSpace</tptz2:URI>
                    <tptz2:XRange>
                        <tptz2:Min>0.000000</tptz2:Min>
                        <tptz2:Max>1.000000</tptz2:Max>
                    </tptz2:XRange>
                </tptz2:AbsoluteZoomPositionSpace>
                <tptz2:PanTiltSpeedSpace>
                    <tptz2:URI>http://www.onvif.org/ver10/tptz/PanTiltSpaces/GenericSpeedSpace</tptz2:URI>
                    <tptz2:XRange>
                        <tptz2:Min>0.000000</tptz2:Min>
                        <tptz2:Max>1.000000</tptz2:Max>
                    </tptz2:XRange>
                </tptz2:PanTiltSpeedSpace>
                <tptz2:ZoomSpeedSpace>
                    <tptz2:URI>http://www.onvif.org/ver10/tptz/ZoomSpaces/ZoomGenericSpeedSpace</tptz2:URI>
                    <tptz2:XRange>
                        <tptz2:Min>0.000000</tptz2:Min>
                        <tptz2:Max>1.000000</tptz2:Max>
                    </tptz2:XRange>
                </tptz2:ZoomSpeedSpace>
            </tptz2:Spaces>
            <tptz2:PTZTimeout>
                <tptz2:Min>PT1S</tptz2:Min>
                <tptz2:Max>PT04M32S</tptz2:Max>
            </tptz2:PTZTimeout>
            <tptz2:PTControlDirection>
                <tptz2:Reverse>
                    <tptz2:Mode>OFF</tptz2:Mode>
                    <tptz2:Mode>ON</tptz2:Mode>
                </tptz2:Reverse>
            </tptz2:PTControlDirection>
        </tptz1:PTZConfigurationOptions>
    </tptz1:GetConfigurationOptionsResponse>
</s:Body>
```

FIG. 12

```xml
<s:Body xmlns:xsi="http://www.w3.org/2001/XMLSchema-instance"
    xmlns:xsd="http://www.w3.org/2001/XMLSchema">
  <SetConfiguration xmlns="http://www.onvif.org/ver20/ptz/wsdl">
    <PTZConfiguration token="0" MoveRamp="2" PresetRamp="0" PresetTourRamp="0">
      <Name xmlns="http://www.onvif.org/ver10/schema">ptz</Name>
      <UseCount xmlns="http://www.onvif.org/ver10/schema">1</UseCount>
      <NodeToken xmlns="http://www.onvif.org/ver10/schema">0</NodeToken>
      <DefaultAbsolutePanTiltPositionSpace xmlns="http://www.onvif.org/ver10/schema">
        http://www.onvif.org/ver10/tptz/PanTiltSpaces/PositionGenericSpace
      </DefaultAbsolutePanTiltPositionSpace>
      <DefaultAbsoluteZoomPositionSpace xmlns="http://www.onvif.org/ver10/schema">
        http://www.onvif.org/ver10/tptz/ZoomSpaces/PositionGenericSpace
      </DefaultAbsoluteZoomPositionSpace>
      <DefaultRelativePanTiltTranslationSpace xmlns="http://www.onvif.org/ver10/schema">
        http://www.onvif.org/ver10/tptz/PanTiltSpaces/TranslationGenericSpace
      </DefaultRelativePanTiltTranslationSpace>
      <DefaultRelativeZoomTranslationSpace xmlns="http://www.onvif.org/ver10/schema">
        http://www.onvif.org/ver10/tptz/ZoomSpaces/TranslationGenericSpace
      </DefaultRelativeZoomTranslationSpace>
      <DefaultContinuousPanTiltVelocitySpace xmlns="http://www.onvif.org/ver10/schema">
        http://www.onvif.org/ver10/tptz/PanTiltSpaces/VelocityGenericSpace
      </DefaultContinuousPanTiltVelocitySpace>
      <DefaultContinuousZoomVelocitySpace xmlns="http://www.onvif.org/ver10/schema">
        http://www.onvif.org/ver10/tptz/ZoomSpaces/VelocityGenericSpace
      </DefaultContinuousZoomVelocitySpace>
      <DefaultPTZSpeed xmlns="http://www.onvif.org/ver10/schema">
        <PanTilt x="1" y="1" space="http://www.onvif.org/ver10/tptz/PanTiltSpaces/GenericSpeedSpace" />
        <Zoom x="1" space="http://www.onvif.org/ver10/tptz/ZoomSpaces/ZoomGenericSpeedSpace" />
      </DefaultPTZSpeed>
      <DefaultPTZTimeout xmlns="http://www.onvif.org/ver10/schema">PT8S</DefaultPTZTimeout>
      <Extension xmlns="http://www.onvif.org/ver10/schema">
        <PTControlDirection>
          <Reverse>
            <Mode>OFF</Mode>
          </Reverse>
        </PTControlDirection>
      </Extension>
    </PTZConfiguration>
    <ForcePersistence>false</ForcePersistence>
  </SetConfiguration>
</s:Body>
```

FIG. 13

SetConfigurationRESPONSE

```
<SOAP-ENV:Body>
 <tptz1:SetConfigurationResponse>
 </tptz1:SetConfigurationResponse>
</SOAP-ENV:Body>
```

IMAGING APPARATUS TO CONTROL ROTATION OF AN IMAGE CAPTURING DEVICE

BACKGROUND OF THE INVENTION

Field of the Invention

The present invention relates to an imaging apparatus. For example, the present invention relates to an imaging apparatus capable of rotating an image capturing unit configured to capture an image of a subject in a predetermined direction.

Description of the Related Art

There has been known an imaging apparatus that can change a direction for capturing an image of a subject by moving a pan head.

Further, there has been known an imaging apparatus that can change a direction for capturing an image according to an instruction transmitted from an external apparatus connected to the imaging apparatus via a network.

Japanese Patent Application Laid-Open No. 2003-8973 discusses an imaging apparatus capable of changing a direction for capturing an image by moving a pan head through a key operation of a mobile phone having a browser function or a mouse operation of a personal computer.

Use of such an imaging apparatus has been diversified, such as monitoring and TV conferences, and imaging apparatuses including various pan heads are now available in a market. An example is use of a pan/tilt/zoom (PTZ) camera capable of rotating an image capturing unit configured to capture an image of a subject in a panning or tilting direction and changing a zoom position of the image capturing unit.

SUMMARY OF THE INVENTION

In the PTZ camera or the like, there is no supposition as to designation of acceleration from the outside when the imaging direction of the image capturing unit is changed. Thus, there is provided an imaging apparatus configured to reduce vibration by lowering acceleration within a specific rotation range.

In the PTZ camera or the like of which acceleration can be designated from the outside, for example, at a specific rotational speed or acceleration, vibration or the like may occur due to an intrinsic resonance frequency of the apparatus. Thus, when control of the acceleration sets a condition of generating the vibration, an image may be indistinct due to vibration or the like of the image capturing unit. Further, the vibration may cause a failure of the imaging apparatus.

According to an aspect of the present invention, an imaging apparatus capable of communicating with an external apparatus via a network includes an image capturing unit configured to capture an image of a subject, a rotation unit configured to rotate the image capturing unit in a predetermined direction, a reception unit configured to receive a control command including information for designating acceleration when the rotation unit rotates the image capturing unit, a first control unit configured to control the rotation unit at the acceleration designated by the control command, a second control unit configured to control the rotation unit at acceleration that is different from the acceleration designated by the control command, a first determination unit configured to determine whether a speed at which the rotation unit rotates the image capturing unit is within a predetermined range, and a control switching unit configured to switch between the first control unit and the second control unit according to a determination result of the first determination unit, and control the rotation unit.

Further features of the present invention will become apparent from the following description of exemplary embodiments with reference to the attached drawings.

BRIEF DESCRIPTION OF THE DRAWINGS

FIG. 10 is a diagram illustrating an example of a GetConfigurationOptions request according to an exemplary embodiment of the present invention.

FIG. 11 is a diagram illustrating an example of a GetConfigurationOptions response according to an exemplary embodiment of the present invention.

FIG. 12 is a diagram illustrating an example of a SetConfiguration request according to an exemplary embodiment of the present invention.

FIG. 13 is a diagram illustrating an example of the SetConfiguration response according to an exemplary embodiment of the present invention.

DESCRIPTION OF THE EMBODIMENTS

Hereinafter, exemplary embodiments of the present invention will be described in detail. Configurations of the exemplary embodiments are only examples, and are in no way limitative of the present invention.

Figure 1A:
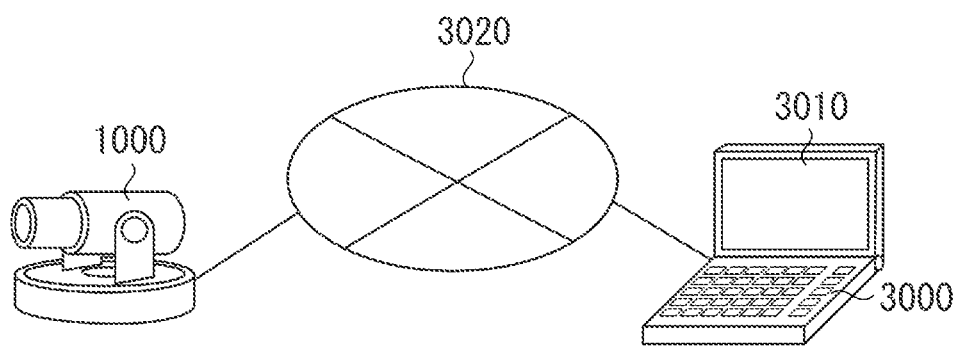
FIGS. 1A and 1B are diagrams respectively illustrating an example of an imaging system according to an exemplary embodiment of the present invention, and an example of a driving mechanism for changing an imaging direction of an imaging apparatus according to a first exemplary embodiment.

FIG. 1A is a diagram illustrating an example of a configuration of an imaging system according to a first exemplary embodiment. In the imaging system according to the present exemplary embodiment, an imaging apparatus 1000 is connected to a client 3000 via a network 3020. This enables the imaging apparatus 1000 to communicate with the client 3000. The imaging apparatus 1000 transmits a captured image to the client 3000 via the network 3020.

The client 3000 is an example of an external apparatus. A display unit 3010 will be described below referring to FIG. 2B. The imaging apparatus 1000 according to the present exemplary embodiment is a monitoring camera for capturing a moving image, and more specifically a network camera used for monitoring. The imaging apparatus 1000 according to the present exemplary embodiment is installed on a wall surface or a ceiling.

The network 3020 includes a plurality of routers, switches, and cables compliant with a communication standard such as Ethernet (registered trademark). In the present exemplary embodiment, any communication standard, any size, and any configuration can be used as long as communication can be carried out between the imaging apparatus 1000 and the client 3000.

For example, the network 3020 may be configured of the Internet, a local area network (LAN), a wireless LAN, or a wide area network (WAN). The imaging apparatus 1000 according to the present exemplary embodiment may support Power over Ethernet (PoE, registered trademark), or receive power supplied via a LAN cable.

The client 3000 transmits a command to the imaging apparatus 1000. For example, the client 3000 transmits a command for changing an imaging direction of the imaging apparatus 1000. The imaging apparatus 1000 changes the imaging direction according to the imaging direction changing command received from the client 3000.

Further, the imaging apparatus 1000 receives, from the client 3000, a command for designating a speed when the imaging direction is changed. The imaging apparatus 1000 changes the speed when the imaging direction is changed according to the received command. In addition, the imaging apparatus 1000 receives, from the client, a command for designating acceleration when the imaging direction is changed. The imaging apparatus 1000 changes the acceleration when the imaging direction is changed according to the received command.

Figure 1B:
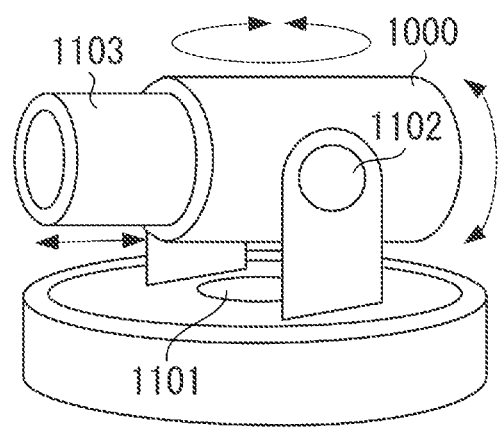

FIG. 1B is a diagram illustrating an example of a driving mechanism for changing the imaging direction of the imaging apparatus 1000 according to the present exemplary embodiment. A pan driving mechanism 1101 changes the imaging direction of the imaging apparatus 1000 in a panning direction. A tilt driving mechanism 1102 changes the imaging direction of the imaging apparatus 1000 in a tilting direction. Further, a zoom mechanism 1103 changes an angle of view of the imaging apparatus 1000.

In the present exemplary embodiment, it is assumed that each of the pan driving mechanism 1101, the tilt driving mechanism 1102, and the zoom mechanism 1103 includes a stepping motor and a gear. In the present exemplary embodiment, the pan driving mechanism 1101 and the tilt driving mechanism 1102 correspond a rotation unit configured to rotate an image capturing unit 1003 described below in a predetermined direction.

Figure 2A:
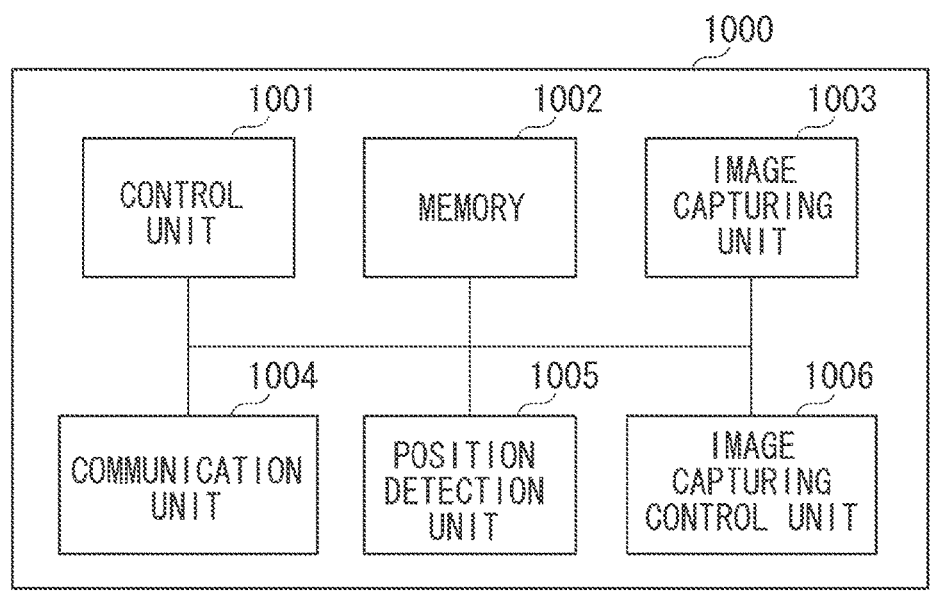
FIGS. 2A and 2B are block diagrams respectively illustrating an example of a hardware configuration of the imaging apparatus according to an exemplary embodiment of the present invention and an example of a hardware configuration of a client according to the first exemplary embodiment.

FIG. 2A is a diagram illustrating an example of a hardware configuration of the imaging apparatus 1000 according to the present exemplary embodiment. In FIG. 2A, a control unit 1001 controls the entire imaging apparatus 1000. The control unit 1001 is, for example, a central processing unit (CPU) configured to execute a program stored in a memory 1002 described below. Alternatively, the control unit 1001 may execute control by using hardware.

The memory 1002 is a storage unit used as a data storage area such as a storage area of the program executed by the control unit 1001, a work area in which the program is currently executed, or a storage area of a captured image generated by the image capturing unit 1003 described below. The memory 1002 stores a coordinate system used for representing the imaging direction of the imaging apparatus 1000. Further, the memory 1002 stores a command retention cue for retaining execution of a command received by a communication unit 1004 described below.

The image capturing unit 1003 converts an analog signal generated by capturing an image of a subject into digital data. The image capturing unit 1003 compresses the data by adaptive discrete cosine transform (ADCT) to generate a captured image, and outputs the captured image to the memory 1002. The image capturing unit 1003 transmits, after outputting the captured image to the memory 1002, an image acquisition event to the control unit 1001.

The communication unit 1004 receives control commands from the client 3000. The communication unit 1004 is also used for transmitting control commands to the client 3000.

A position detection unit 1005 detects coordinates of the pan driving mechanism 1101, the tilt driving mechanism 1102, and the zoom mechanism 1103. When a request for information about the imaging direction or the angle of view is transmitted from the client 3000 to the imaging apparatus 1000, the imaging apparatus 1000 detects the coordinates of each mechanism by the position detection unit 1005, and transmits the detected coordinates as position information to the client 3000.

An image capturing control unit 1006 controls the pan driving mechanism 1101, the tilt driving mechanism 1102, and the zoom mechanism 1103 according to an instruction from the control unit 1001. In other words, when the communication unit 1004 receives an image capturing range changing command from the client 3000, a reception event according to the received command is transmitted to the control unit 1001.

The control unit 1001, upon receiving the reception event, issues a control instruction to the image capturing control unit 1006 according to a content of the reception event. The image capturing control unit 1006 that has received the control instruction performs control for driving the pan driving mechanism 1101, the tilt driving mechanism 1102, and the zoom mechanism 1103 according to the control instruction.

The internal configuration of the imaging apparatus 1000 has been described. The processing blocks illustrated in FIG. 2A illustrate the imaging apparatus according to the exemplary embodiment of the present invention, and in no way limitative of the invention. Various modifications and changes can be made, such as inclusion of an audio input unit, within the gist of the present invention.

Figure 2B:
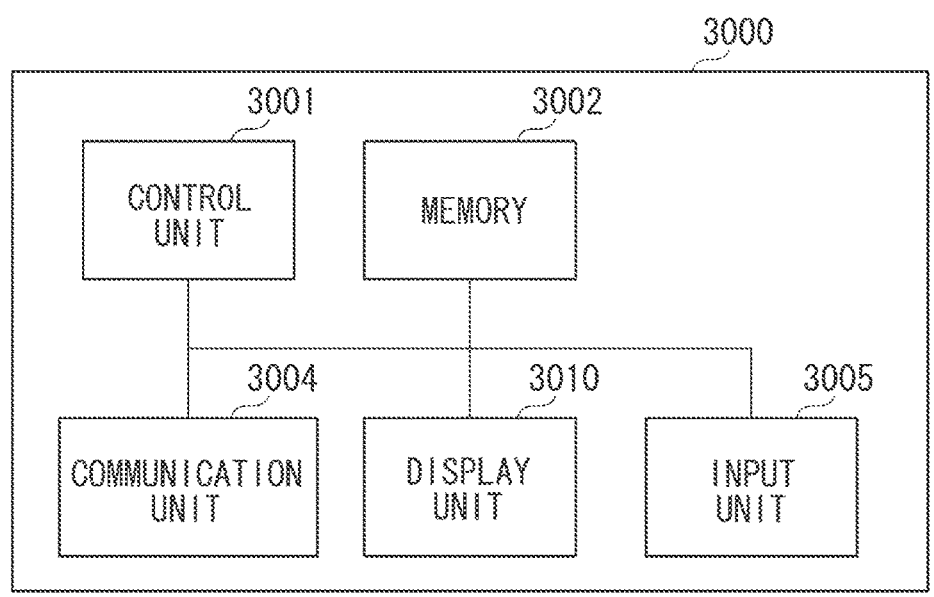

FIG. 2B is a diagram illustrating an example of a hardware configuration of the client 3000 according to the present exemplary embodiment. The client 3000 according to the present exemplary embodiment is configured as a computer apparatus connected to the network 3020.

A control unit 3001 controls the entire client 3000. The control unit 3001 is, for example, a CPU configured to execute a program stored in a memory 3002 described below. Alternatively, the control unit 3001 may execute control by using hardware.

The memory 3002 is used as a storage area of the program executed by the control unit 3001, a work area in which the program is currently executed, and a data storage area. A communication unit 3004 receives a captured image transmitted from the imaging apparatus 1000. The communication unit 3004 transmits a command for controlling the imaging apparatus 1000 or a command for requesting information of the imaging apparatus 1000.

An input unit 3005 receives an instruction input from a user. For example, the input unit 3005 can receive, as the instruction from the user, an input of a transmission instruction of various types of commands to the imaging apparatus 1000.

The input unit 3005 notifies, after a command transmission instruction to the imaging apparatus 1000 has been input from the user, the control unit 3001 of the input of the command. The control unit 3001 performs, according to the instruction input to the input unit 3005, transmission control for generating a command to the imaging apparatus 1000 and transmitting the generated command to the imaging apparatus 1000 via the communication unit 3004.

Further, the input unit 3005 can receive an input of a user's response to an inquiry message to the user or the like generated by executing the program stored in the memory 3002 by the control unit 3001.

A display unit 3010 displays the captured image received by the communication unit 3004. The display unit 3010 can display the inquiry message to the user or the like generated by executing the program stored in the memory 3002 by the control unit 3001.

Figure 3:
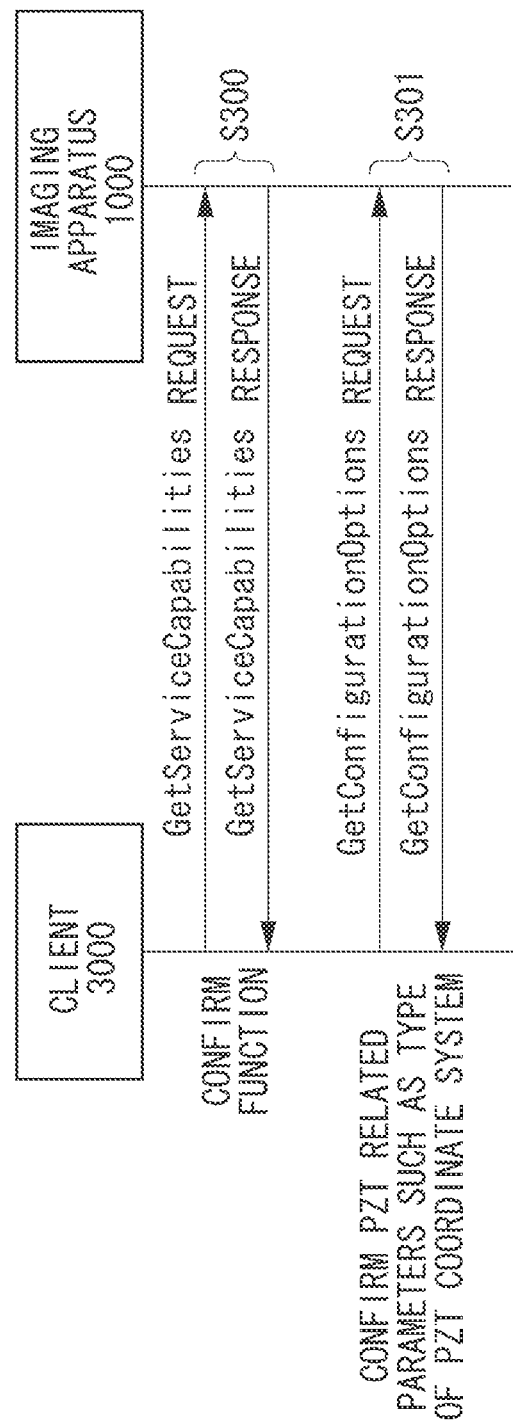
FIG. 3 is a diagram illustrating a command sequence between the client and the imaging apparatus according to the first exemplary embodiment of the present invention.

FIG. 3 is a diagram illustrating a command sequence carried out between the client 3000 and the imaging apparatus 1000 to inquire information about the imaging direction of the imaging apparatus 1000. Referring to FIG. 3, a command request transmitted from the client 3000 to the imaging apparatus 1000 and a command response transmitted from the imaging apparatus 1000 to the client 3000 in response thereto will be described.

Each command request includes destination address information indicating a destination of the imaging apparatus 1000 that is a target to be caused to execute a command, and transmission source address information of the client 3000 that is a command transmission source.

On the other hand, each command response includes destination address information indicating a destination of the client 3000, to which a result of the command is returned, and transmission source address information of the imaging apparatus 1000 that is a result transmission source. Each command includes information about a command content and an argument.

In the present exemplary embodiment, it is assumed that the command request and the command response are defined based on, for example, Open Network Video Interface Forum (ONVIF) Standard. According to the ONVIF Standard, data types used for the command request and the command response are defined by using Extensible Markup Language (XML) SchemaDefinition language (hereinafter, may be referred to as XSD). The command request and the command response are described by using XML.

Further, the imaging apparatus 1000 according to the present exemplary embodiment operates as a network video transmitter (hereinafter, may be referred to as NVT) based on the ONVIF Standard.

In step S300 illustrated in FIG. 3, the control unit 3001 instructs the communication unit 3004 to transmit a "GetServiceCapabilities request" to the imaging apparatus 1000. This "GetServiceCapabilities request" is a command for making an inquiry about a function provided by the imaging apparatus 1000.

In the imaging apparatus 1000 that has received the "GetServiceCapabilities request", the control unit 1001 instructs the communication unit 1004 to return a "GetServiceCapabilities response" to the client 3000. This "GetServiceCapabilities response" is a response indicating whether the imaging apparatus 1000 supports a function or a command according to the present exemplary embodiment.

In step S301, the control unit 3001 instructs the communication unit 3004 to transmit a "GetConfigurationOptions request" to the imaging apparatus 1000. This "GetConfigurationOptions request" is a request for making an inquiry about PTZ related parameters including a type of a PTZ coordinate system. FIG. 10 illustrates an example of the GetServiceCapabilities request.

In the imaging apparatus 1000 that has received the "GetConfigurationOptions request", the control unit 1001 instructs the communication unit 1004 to return a "GetConfigurationOptions response" to the client 3000. This response includes pan relative/absolute coordinate system information, tilt relative/absolute coordinate system information, pan tilt speed relative/absolute information, and pan tilt acceleration relative/absolute information.

FIG. 11 illustrates an example of the GetConfigurationOptions response.

The client 3000 can acquire information about a designation of "acceleration" when the imaging direction of the imaging apparatus 1000 is changed based on the "GetConfigurationOptions response" received from the imaging apparatus 1000.

For example, a case where a speed and an acceleration when the imaging direction of the imaging apparatus 1000 is changed can be designated is assumed. In this case, the "GetConfigurationOptions response" includes the tags such as a <tptz 2: PantiltSpeedSpace> tag, and a <tptz 1: PTZConfigurationOptions PTZRamps="0 1 2 3"> tag.

In the present exemplary embodiment, the <tptz1:PTZConfigurationOptions PTZRamps="0 1 2 3"> tag corresponds to acceleration information enabling the imaging apparatus 1000 to operate.

The control unit 3001 determines whether the <tptz 1: PTZConfigurationOptions PTZRamps="0 1 2 3"> tag includes "PTZRamps="0 1 2 3"". When "PTZRamps="0 1 2 3"" is included therein, the control unit 3001 determines that acceleration, when the imaging direction of the imaging apparatus 1000 is changed, can be designated. On the other hand, when "PTZRamps="0 1 2 3"" is not included therein, the control unit 3001 determines that acceleration, when the imaging direction of the imaging apparatus 1000 is changed, cannot be designated.

In the imaging apparatus 1000 according to the present exemplary embodiment, four types of acceleration can be set, and indexes of 0, 1, 2, and 3 are respectively allocated thereto. In other words, the client 3000 can designate, by designating such an index, acceleration when the imaging direction of the imaging apparatus 1000 is changed. For example, by designating an index 0, the client 3000 can designate acceleration to be α0 when the imaging direction of the imaging apparatus 1000 is changed.

Based on such a "GetConfigurationOptions response" difference, the client 3000 can determine whether acceleration, when the imaging direction of the imaging apparatus 1000 is changed, can be designated.

Similarly, the client 3000 can determine whether acceleration, when the angle of view of the imaging apparatus 1000 is changed, can be designated, based on the "GetConfigurationOptions response" received from the imaging apparatus 1000.

Thus, the "GetConfigurationOptions response" in the present exemplary embodiment corresponds to information indicating whether a speed or acceleration, when the imaging direction of the imaging apparatus 1000 is changed, can be designated.

In the present exemplary embodiment, in the imaging apparatus 1000, the four types of acceleration can be set. Not limited to this, however, more than or less than the four types of acceleration can be set.

Figure 4:
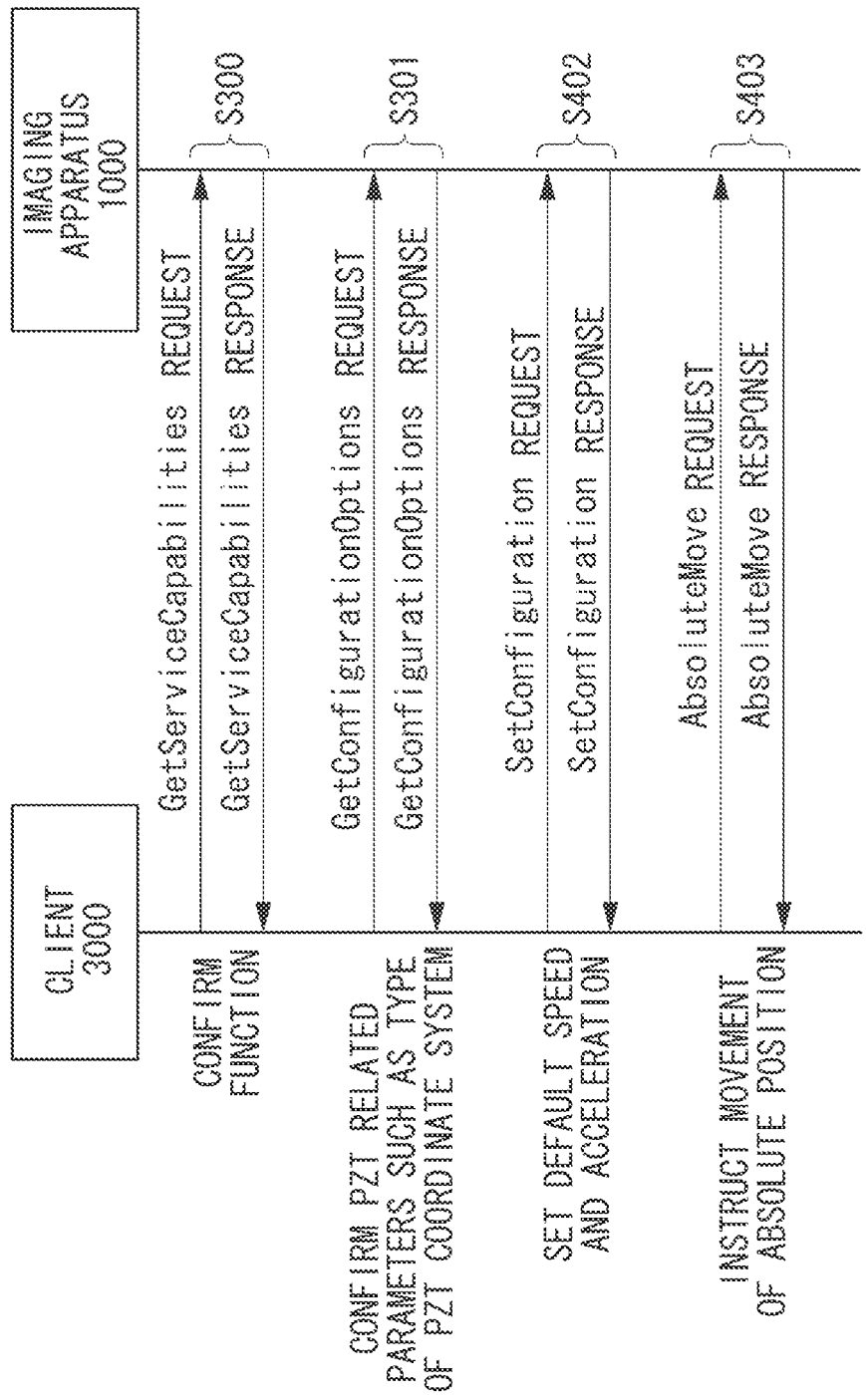
FIG. 4 is a diagram illustrating a command sequence between the client and the imaging apparatus according to the first exemplary embodiment of the present invention.

FIG. 4 is a diagram illustrating a command sequence carried out between the client 3000 and the imaging apparatus 1000 to designate a speed and acceleration when the imaging direction of the imaging apparatus 1000 is changed. Step S300 illustrated in FIG. 4 is similar to step S300 illustrated in FIG. 3, and thus description thereof is omitted. Step S301 illustrated in FIG. 4 is similar to step S301 illustrated in FIG. 3, and thus description thereof is omitted.

In step S402, the control unit 3001 instructs the communication unit 3004 to transmit a "SetConfiguration request" to the imaging apparatus 1000. This request includes, for example, a speed and acceleration when the imaging direction of the imaging apparatus 1000 is changed.

FIG. 12 is a diagram illustrating an example of the SetConfiguration request. Acceleration when the imaging direction is changed can be designated by an index acquired through a GetConfigurationOptions response. In the present exemplary embodiment, the SetConfiguration request corresponds to a control command for controlling the rotation unit such as the pan driving mechanism 1101 and the like.

In the imaging apparatus 1000 that has received the "SetConfiguration request", the control unit 1001 instructs the communication unit 1004 to transmit a "SetConfiguration response" to the client 3000. FIG. 13 illustrates an example of the SetConfiguration response.

In step S403, the control unit 3001 instructs the communication unit 3004 to transmit, for example, an "AbsoluteMove request" to the imaging apparatus 1000.

In the imaging apparatus 1000 that has received "AbsoluteMove request", the control unit 1001 instructs the communication unit 1004 to return an "AbsoluteMove response" to the client 3000.

The "AbsoluteMove request" is a command for changing the imaging direction of the imaging apparatus 1000 by designating absolute positions of panning and tilting directions and an absolute position of the zooming. The "AbsoluteMove response" is a response to the "AbsoluteMove request".

The "GetConfigurationOptions response" in the present exemplary embodiment corresponds to designation information about the "SetConfiguration request" used by the control unit 1001.

Figure 5:
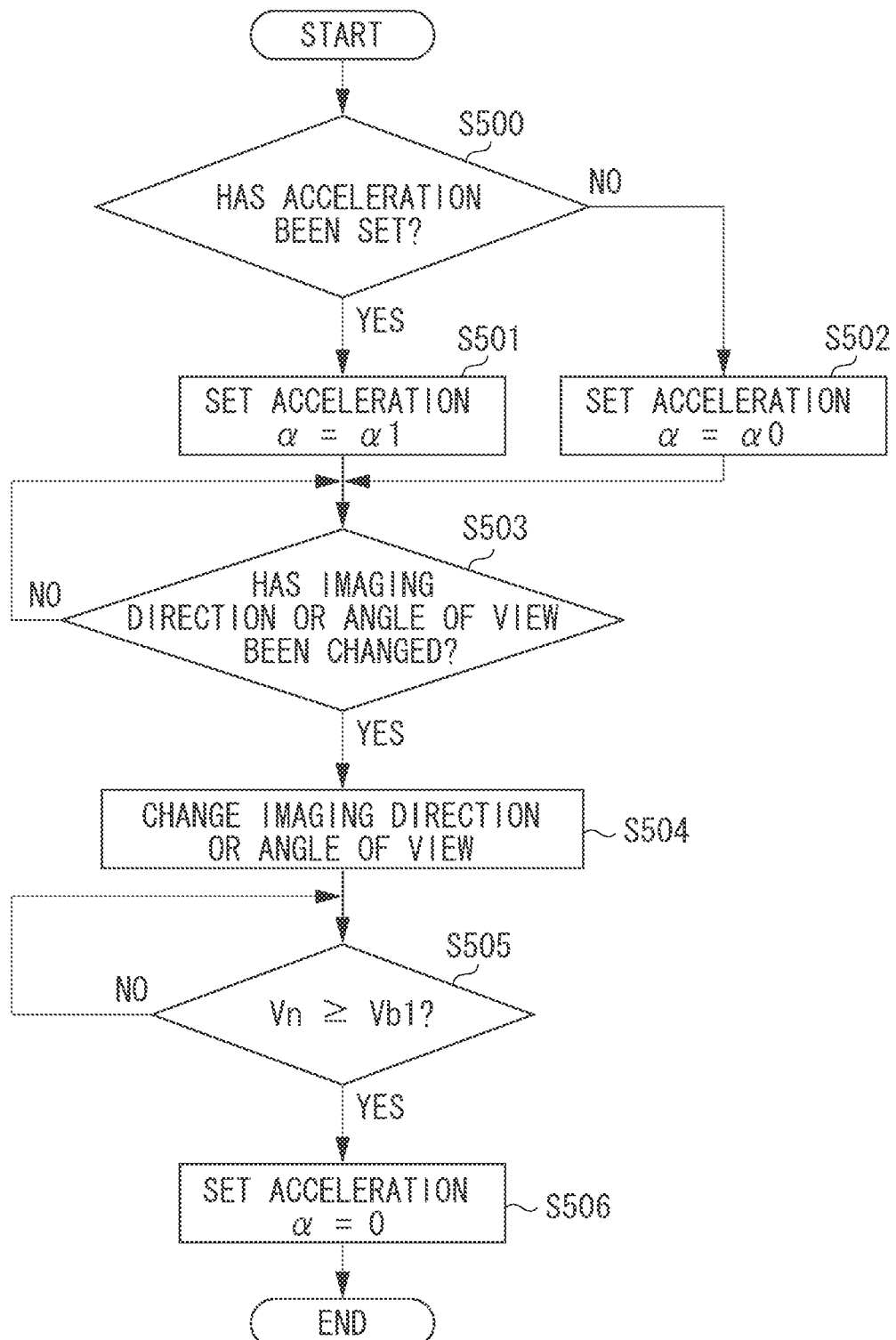
FIG. 5 is a flowchart illustrating an example of processing for changing the imaging direction of the imaging apparatus according to the first exemplary embodiment of the present invention.

FIG. 5 is a flowchart illustrating, concerning an operation of the imaging apparatus 1000 based on setting from the client 3000, an example of processing for changing the imaging direction of the imaging apparatus 1000.

This processing is carried out by the control unit 1001. In the present exemplary embodiment, before starting the processing, a speed $V_0$ and default acceleration $\alpha 0$, when the imaging direction of the imaging apparatus 1000 is changed, are respectively set.

A specific rotational speed $V_{a1}$ at which vibration is generated in the imaging apparatus 1000 and a rotational speed $V_{b1}$ at which no vibration is generated in the imaging apparatus 1000, are defined. In the present exemplary embodiment, the rotational speeds $V_{a1}$ and $V_{b1}$ are acquired by simulation or measurement at a factory, and stored in the memory 1002.

In step S500 illustrated in FIG. 5, the control unit 1001 determines whether acceleration, when the imaging direction or the angle of view of the imaging apparatus 1000 is changed, has been set by the client 3000 in step S402 illustrated in FIG. 4. When it is set by the client 3000 (YES in step S500), the processing proceeds to step S501. On the other hand, when it is not set thereby (NO in step S500), the processing proceeds to step S502.

In step S501, the control unit 1001 sets the acceleration, when the imaging direction of the imaging apparatus 1000 is changed, to acceleration $\alpha 1$ set by the client 3000. Then, the processing proceeds to step S503. On the other hand, in step S502, the control unit 1001 sets the acceleration, when the imaging direction of the imaging apparatus 1000 is changed, to the default acceleration $\alpha 0$. Then, the processing proceeds to step S503.

In step S503, the control unit 1001 determines whether the imaging direction of the imaging apparatus 1000 has been changed by the client 3000. More specifically, the control unit 1001 determines whether the imaging apparatus 1000 has received the "AbsoluteMove request" or the like in step S403 illustrated in FIG. 4. When it is changed (YES in step S503), the processing proceeds to step S504. On the other hand, when it is not changed (NO in step S503), the processing returns to step S503.

In Step S504, the control unit 1001 changes the imaging direction or the angle of view based on setting from the imaging apparatus 1000. More specifically, the imaging apparatus 1000 changes the imaging direction to the absolute position or the like designated by the "AbsoluteMove request" in step S403 illustrated in FIG. 4. In this case, the control unit 1001 issues a control instruction to the image capturing control unit 1006. The image capturing control unit 1006 that has received the control instruction executes, by using the acceleration set in one of steps S501 and S502, control for driving the pan driving mechanism 1101 or the like according to the control instruction. Then, the processing proceeds to step S505.

In step S505, the control unit 1001 monitors a speed Vn at which the imaging direction of the imaging apparatus 1000 is change. More specifically, the control unit 1001 calculates the speed at which the imaging direction or the angle of view is to be changed by using the speed $V_0$, set acceleration $\alpha$, or elapsed time $T_a$. Then, the control unit 1001 determines a speed relationship between the calculated speed and a rotational speed $V_{b1}$ at which no vibration is generated. When the calculated speed is higher than $V_{b1}$ (YES in step S505), the processing proceeds to step S506. On the other hand, when the calculated speed is not higher than $V_{b1}$ (NO in step S505), the processing returns to step S505.

In step S506, the control unit 1001 controls acceleration in changing the imaging direction of the imaging apparatus 1000. More specifically, the control unit 1001 reduces the acceleration. As an example, the control unit 1001 sets the acceleration to 0 to switch to a uniform motion operation. Then, if necessary, the control unit 1001 executes a speed reduction operation to stop the apparatus at a target position designated by the client 3000 in the imaging direction, and ends the processing.

In step S505, the control unit 1001 uses the elapsed time $T_a$ to calculate the speed Vn. However, by using a distance to the position designated by the client 3000, the control unit 1001 may calculate time until the speed of the imaging apparatus 1000 reaches the speed $V_{b1}$.

In step S505, the control unit 1001 calculates the speed Vn. However, a speed detection unit such as a photointerrupter may be mounted in the pan driving mechanism 1101 or the like to directly measure the speed.

In step S505, the control unit 1001 controls the speed Vn so as not to exceed the rotational speed $V_{b1}$ different from the specific rotational speed $V_{a1}$ at which vibration is caused. However, the control unit 1001 may execute control so as to match the rotational speed $V_{b1}$ with the rotational speed $V_{a1}$.

In step S505, the control unit 1001 compares the speed Vn with the specific rotational speed $V_{a1}$ at which vibration is caused. However, a parameter other than the speed may be used. For example, a measurement unit for measuring vibration may be mounted in the imaging apparatus 1000 to directly measure vibration, and a result may be used as a parameter.

In step S506, the control unit 1001 sets the acceleration to 0 to perform the uniform motion operation. However, when the speed drops due to friction or the like, the control unit 1001 may perform an operation of increasing the acceleration if necessary. In the present exemplary embodiment, the control unit 1001 corresponds to a control switching unit configured to control the acceleration in changing the imaging direction.

Figure 6:
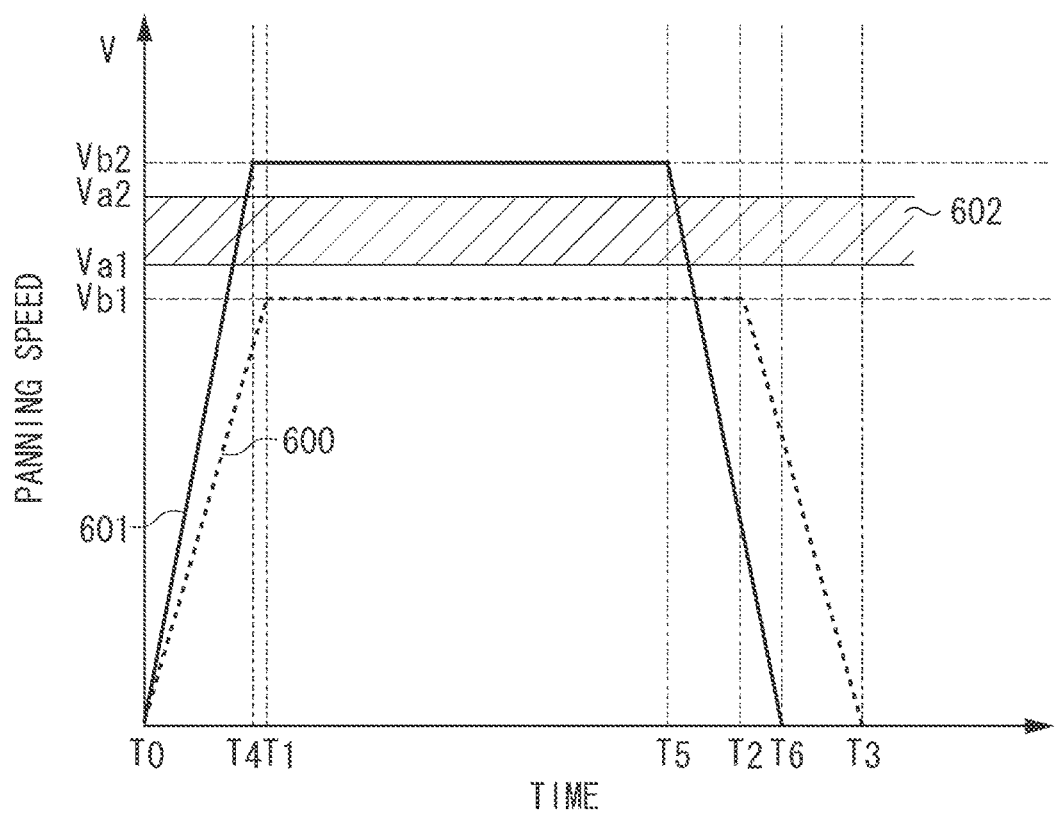
FIG. 6 is a graph illustrating an example of change in "speed" when the imaging direction of the imaging apparatus is changed according to an exemplary embodiment of the present invention.

FIG. 6 is a graph illustrating an example of a speed change for rotating the image capturing unit 1003 in a panning direction. As illustrated therein, the speed changes with the following time. Specifically, The time is the time from when the imaging apparatus 1000 that has received an AbsoluteMove command starts movement of the imaging direction of the imaging apparatus 1000, until the imaging direction reaches a predetermined direction and then stops the movement. The imaging apparatus 1000 vibrates within a range 602 of specific rotational speeds Va1 to Va2.

In FIG. 6, a broken line 600 indicates the change of the speed for rotating the image capturing unit 1003 in the panning direction. For example, the broken line 600 indicates a state of accelerating, from time T0 to time T1, the speed up to the speed $V_{b1}$ at acceleration α1. Then, from the time T1 to time T2, the broken line 600 indicates a state where the speed for rotating the image capturing unit 1003 in the panning direction is kept at the speed $V_{b1}$.

Then, the broken line 600 indicates a state where the image capturing unit 1003 approaches a stop position, the speed for rotating the image capturing unit 1003 in the panning direction is reduced at acceleration −α1 from the time T2 to time T3, and the speed is 0 when the image capturing unit 1003 reaches the stop position.

In this way, by setting a specific speed as a limit speed and limiting the speed to be lower than the specific speed (lower than speed range), generation of vibration at the imaging apparatus 1000 can be reduced.

The speed $V_{b1}$ may be set by the client 3000. The speed $V_{b1}$ may be calculated based on an installation position, an installation posture, weight of the imaging apparatus 1000, or the like.

Figure 7:
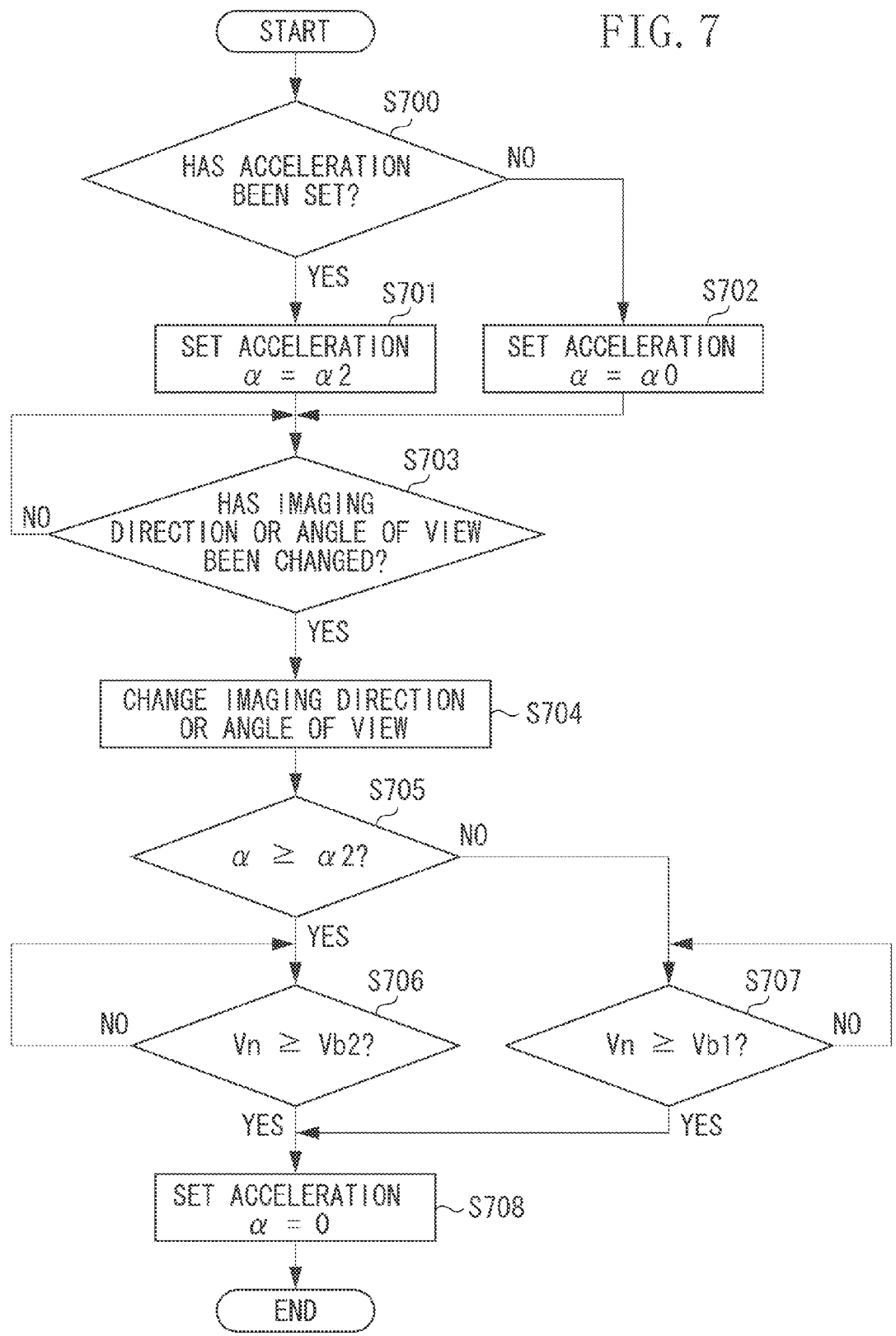
FIG. 7 is a flowchart illustrating an example of processing for changing an imaging direction of an imaging apparatus according to a second exemplary embodiment of the present invention.

FIG. 7 is a flowchart illustrating, concerning an operation of an imaging apparatus 1000 based on setting from a client 3000, an example of processing for changing an imaging direction of the imaging apparatus 1000 according to a second exemplary embodiment of the present invention.

In the present exemplary embodiment, a range of specific rotational speeds is between $V_{a1}$ and $V_{a2}$, in which vibration is generated at the imaging apparatus 1000. A rotational speed $V_{b1}$ is lower than $V_{a1}$ and no vibration is generated at the speed $V_{b1}$ in the imaging apparatus 1000. A rotational speed $V_{b2}$ is higher than $V_{a2}$, and no vibration is generated at the speed $V_{b2}$ in the imaging apparatus 1000. In the present exemplary embodiment, acceleration α2 set by the client 3000 is larger than acceleration α1. In the present exemplary embodiment, values of the speeds $V_{a1}$, $V_{a2}$, $V_{b1}$, and $V_{b2}$ are stored in a memory 1002.

In step S700 illustrated in FIG. 7, a control unit 1001 determines whether acceleration when the imaging direction or the angle of view of the imaging apparatus 1000 is changed has been set by the client 3000 in step S402 illustrated in FIG. 4. When the control unit 1001 determines that the acceleration has been set by the client 3000 (YES in step S700), the processing proceeds to step S701. On the other hand, when the control unit 1001 determines that the acceleration has not been set by the client 3000 (NO in step S700), the processing proceeds to step S702.

In step S701, the control unit 1001 sets acceleration when the imaging direction of the imaging apparatus 1000 is changed to acceleration α2 set by the client 3000. Then, the processing proceeds to step S703. On the other hand, in step S702, the control unit 1001 sets acceleration when the imaging direction of the imaging apparatus 1000 is changed to default acceleration α0. Then, the processing proceeds to step S703.

In step S703, the control unit 1001 determines whether the imaging direction of the imaging apparatus 1000 has been changed by the client 3000. More specifically, the control unit 1001 determines whether the imaging apparatus 1000 has received an "AbsoluteMove request" or the like in step S403 illustrated in FIG. 4. When the imaging direction of the imaging apparatus 1000 has been changed by the client 3000 (YES in step S703), the processing proceeds to step S704. On the other hand, when the imaging direction of the imaging apparatus 1000 has not been changed by the client 3000 (NO in step S703), the processing returns to step S703.

In Step S704, the control unit 1001 changes the imaging direction or the angle of view based on setting from the imaging apparatus 1000. More specifically, the imaging apparatus 1000 changes the imaging direction to an absolute position designated by the "AbsoluteMove request" in step S403 illustrated in FIG. 4. In this case, the control unit 1001 issues a control instruction to an image capturing control unit 1006. The image capturing control unit 1006 that has received the control instruction executes, by using the acceleration set in one of steps S701 and S702, control for driving a pan driving mechanism 1101 or the like according to the control instruction. Then, the processing returns to step S705.

In step S705, the control unit 1001 determines acceleration in changing the imaging direction of the imaging apparatus 1000. When the determination result is that the acceleration is higher than a2 (YES in step S705), the processing proceeds to step S706. On the other hand, when the determination result is that the acceleration is not higher than a2 (NO in step S705), the processing returns to step S707.

In step S706, the control unit 1001 monitors a speed in changing the imaging direction of the imaging apparatus 1000. More specifically, the control unit 1001 calculates a speed change Vn in the imaging direction or the angle of view by using a speed $V_0$, set acceleration α, or elapsed time $T_a$. Then, the control unit 1001 determines a magnitude relationship between the calculated speed Vn and a rotational speed $V_{b2}$ at which no vibration is generated. When the speed Vn is higher than $V_{b2}$ (YES in step S706), the processing proceeds to step S708. On the other hand, when the speed Vn is not higher than $V_{b2}$ (NO in step S706), the processing returns to step S706.

In step S707, the control unit 1001 monitors a speed change in the imaging direction of the imaging apparatus 1000. More specifically, the control unit 1001 calculates a speed Vn in changing the imaging direction or the angle of view by using the speed $V_0$, the set acceleration α, or the elapsed time $T_a$. Then, the control unit 1001 determines a magnitude relationship between the calculated speed Vn and a rotational speed $V_{b1}$ at which no vibration is generated. When the speed Vn is higher than $V_{b1}$ (YES in step S707), the processing proceeds to step S708. On the other hand, when the speed Vn is not higher than $V_{b1}$ (NO in step S707), the processing returns to step S707.

In step S708, the control unit 1001 controls acceleration in changing the imaging direction of the imaging apparatus 1000. More specifically, the control unit 1001 reduces the acceleration. As an example, the control unit 1001 sets the acceleration to 0 to switch to a uniform motion operation. Then, if necessary, the control unit 1001 executes a speed reduction operation to stop the apparatus at a target position designated by the client 3000 in the imaging direction, and ends the processing.

Thus, through the operation described above, the imaging apparatus 1000 can reduce the time during which the speed for changing the imaging direction stays within the range of the specific rotational speeds $V_{a1}$ to $V_{a2}$ at which vibration is generated. In other words, when acceleration higher than predetermined acceleration is set, the imaging apparatus 1000 can reduce the time period during which the speed for changing the imaging direction stays within the range of the specific rotational speeds $V_{a1}$ to $V_{a2}$ at which vibration is generated. Then, the imaging apparatus 1000 can change the imaging direction at a speed equal to or higher than the range of the specific rotational speeds in which vibration is generated. As a result, the time required for an operation up to the designated position can be reduced.

In step S706, the control unit 1001 controls the speed Vn so as not to be lower than the rotational speed $V_{b2}$ different from the specific rotational speed $V_{a2}$ at which vibration is not generated. However, the control unit 1001 may execute control so as to match the rotational speed $V_{b2}$ with the rotational speed $V_{a2}$.

In step S707, the control unit 1001 controls the speed Vn so as not to exceed the rotational speed $V_{b1}$ different from the specific rotational speed $V_{a1}$ at which vibration is generated. However, the control unit 1001 may execute control so as to match the rotational speed $V_{b1}$ with the rotational speed $V_{a1}$.

In steps S706 and S707, the control unit 1001 uses the elapsed time $T_a$ or the like to calculate the speed Vn. However, by using a distance to the position designated by the client 3000, the control unit 1001 may calculate time until the speed Vn reaches the speed $V_{b1}$.

In steps S706 and S707, the control unit 1001 calculates the speed Vn. However, a speed detection unit such as a photointerrupter may be mounted in the pan driving mechanism 1101 or the like to directly measure the speed.

In step S708, the control unit 1001 sets the acceleration to 0 to perform the uniform motion operation. However, when the speed drops due to friction or the like, the control unit 1001 may perform an operation of increasing the acceleration if necessary. In the present exemplary embodiment, the control unit 1001 corresponds to a control switching unit configured to control the acceleration for changing the imaging direction.

In FIG. 6, a solid line 601 indicates a speed change for rotating the image capturing unit 1003 in the panning direction. For example, the solid line 601 indicates a state of accelerating, from the time T0 to time T4, the speed up to the speed $V_{b2}$ at acceleration α2. The acceleration α2 is larger than the acceleration α1. From the time T4 to time T5, the solid line 601 indicates a state where the speed for rotating the image capturing unit 1003 in the panning direction is kept at the speed $V_{b2}$.

Then, the solid line 601 indicates a state where the image capturing unit 1003 approaches a stop position, the speed for rotating the image capturing unit 1003 in the panning direction is reduced at acceleration −α2 from the time T5 to time T6, and the speed is 0 when the image capturing unit 1003 reaches the stop position.

In this way, even when the speed Vb1 is lower than the speed intended by the user, through the operation for controlling the speed according to the acceleration, the time required for suppressing generation of vibration at the imaging apparatus 1000 and operating the imaging apparatus 1000 to the designated position in the imaging direction can be reduced.

The speeds $V_{b1}$ and $V_{b2}$ may be set by the client 3000. The speed $V_{b1}$ and $V_{b2}$ may be calculated based on an installation position, an installation posture, weight of the imaging apparatus 1000, or the like.

Figure 8:
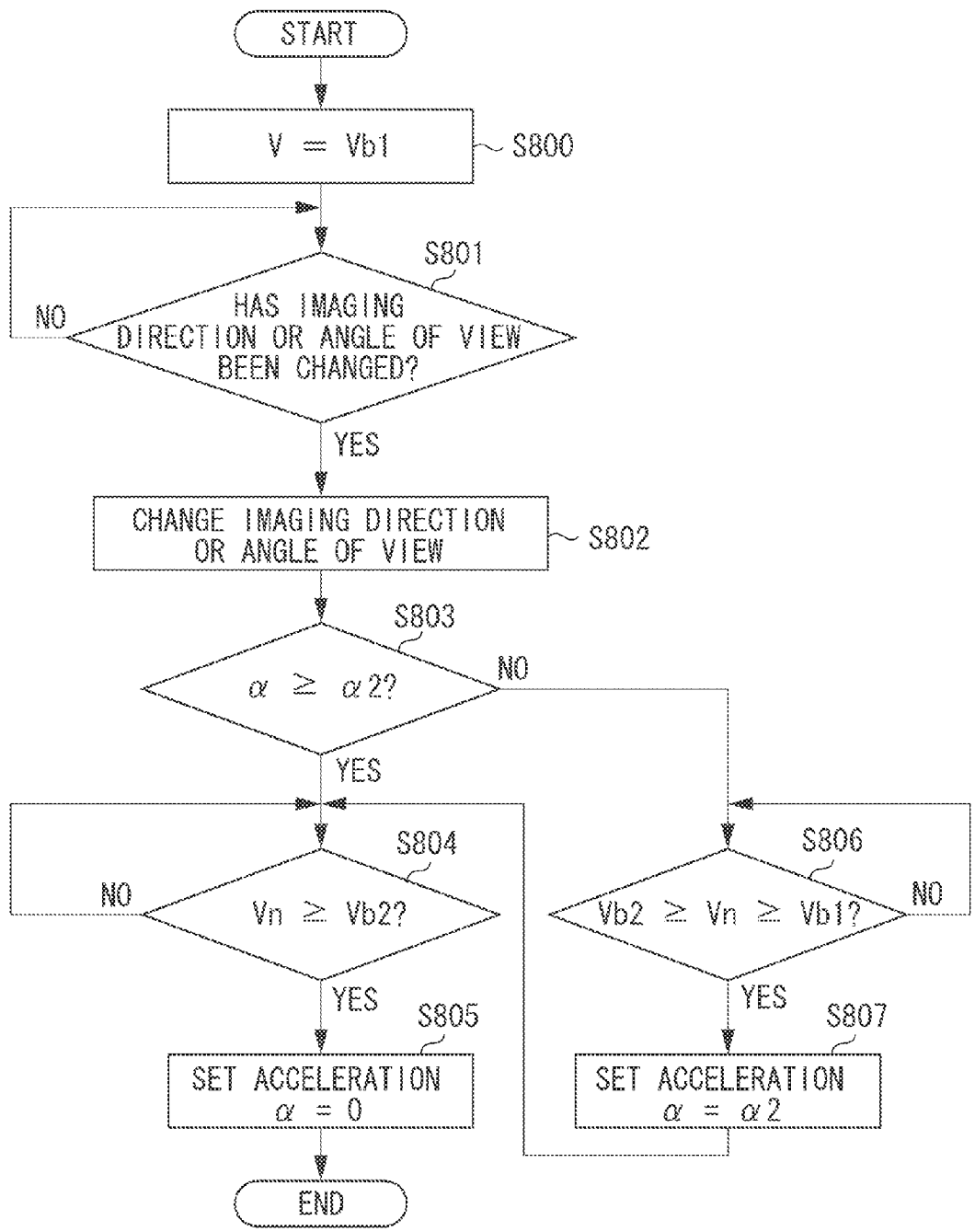
FIG. 8 is a flowchart illustrating an example of processing for changing an imaging direction of an imaging apparatus according to a third exemplary embodiment of the present invention.

FIG. 8 is a flowchart illustrating, concerning an operation of an imaging apparatus 1000 based on setting from a client 3000, an example of processing for changing an imaging direction of the imaging apparatus 1000 according to a third exemplary embodiment of the present invention.

In a range of specific rotational speeds $V_{a1}$ to $V_{a2}$, vibration is generated at the imaging apparatus 1000. A rotational speed $V_{b1}$ is lower than $V_{a1}$ and no vibration is not generated at the speed $V_{b1}$ in the imaging apparatus 1000, and a rotational speed $V_{b2}$ is higher than $V_{a2}$ and no vibration is generated at the speed $V_{b2}$ in the imaging apparatus 1000. In the present exemplary embodiment, a case where a speed $V_{b2}$ for changing an imaging direction of the imaging apparatus 1000 has been set by the client 300 is supposed. In the present exemplary embodiment, acceleration α2 set by the client 3000 is larger than acceleration α1. In the present exemplary embodiment, values of the speeds $V_{a1}$, $V_{a2}$, $V_{b1}$, and $V_{b2}$ are stored in a memory 1002.

In step S800 illustrated in FIG. 8, a control unit 1001 sets a speed $V_{b2}$ for changing an imaging direction or an angle of view of the imaging apparatus 1000 in step S402 illustrated in FIG. 4. Then, the processing proceeds to step S801.

In step S801, the control unit 1001 determines whether the imaging direction of the imaging apparatus 1000 has been changed by the client 3000. More specifically, the control unit 1001 determines whether the imaging apparatus 1000 has received an "AbsoluteMove request" or the like in step S403 illustrated in FIG. 4. When the imaging direction of the imaging apparatus 1000 has been changed by the client 3000 (YES in step S801), the processing proceeds to step S802. On the other hand, when the imaging direction of the imaging apparatus 1000 has not been changed by the client 3000 (NO in step S801), the processing returns to step S801.

In Step S802, the control unit 1001 changes the imaging direction or the angle of view based on setting from the imaging apparatus 1000. More specifically, the imaging apparatus 1000 changes the imaging direction to an absolute position or the like designated by the "AbsoluteMove request" in step S403 illustrated in FIG. 4. In this case, the control unit 1001 issues a control instruction to an image capturing control unit 1006. The image capturing control unit 1006 that has received the control instruction executes, by using predetermined acceleration, control for driving a pan driving mechanism 1101 or the like according to the control instruction. Then, the processing proceeds to step S803.

In step S803, the control unit 1001 determines acceleration for changing the imaging direction of the imaging apparatus 1000. When it is determined that the acceleration is larger than a2 (YES in step S803), the processing proceeds to step S804. On the other hand, when it is determined that the acceleration is not larger than α2 (NO in step S803), the processing proceeds to step S806.

In step S804, the control unit 1001 monitors a speed in changing the imaging direction of the imaging apparatus 1000. More specifically, the control unit 1001 calculates a speed in changing the imaging direction or the angle of view by using a speed $V_0$, set acceleration α, or elapsed time $T_a$. Then, the control unit 1001 determines a magnitude relationship between the calculated speed Vn and a rotational speed $V_{b2}$ at which no vibration is generated. When the speed Vn is higher than $V_{b2}$ (YES in step S804), the processing proceeds to step S805. On the other hand, when the speed Vn is not higher (NO in step S804), the processing returns to step S804.

In step S805, the control unit 1001 controls acceleration in changing the imaging direction of the imaging apparatus 1000. More specifically, the control unit 1001 reduces the acceleration. As an example, the control unit 1001 sets the acceleration to 0 to switch to a uniform motion operation. Then, if necessary, the control unit 1001 executes a speed reduction operation to stop the apparatus at a target position designated by the client 3000 in the imaging direction, and ends the processing.

On the other hand, in step S806, as in the case of step S804, the control unit 1001 monitors a speed in changing the imaging direction of the imaging apparatus 1000. Then, the control unit 1001 determines a magnitude relationship between the calculated speed Vn and rotational speeds $V_{b1}$ and $V_{b2}$ at which no vibration is generated. When the speed Vn is higher than $V_{b1}$ (YES in step S806), the processing proceeds to step S807. On the other hand, when the speed Vn is not higher than $V_{b1}$ (NO in step S806), the processing returns to step S806.

In step S807, the control unit 1001 controls acceleration in changing the imaging direction of the imaging apparatus 1000. More specifically, the control unit 1001 increases the acceleration. As an example, the control unit 1001 switches the acceleration to α2. Then, the processing returns to step S804.

In this way, through the operation described above, the imaging apparatus 1000 can reduce, by increasing the acceleration when the speed for changing the imaging direction is within the range of the specific rotational speeds $V_{a1}$ to $V_{a2}$ in which vibration is generated, the time staying in the range. In other words, the imaging apparatus 1000 can reduce the time period during which the speed for changing the imaging direction is within the range of the specific rotational speeds $V_{a1}$ to $V_{a2}$ in which vibration is generated, by setting the acceleration larger than the predetermined acceleration automatically.

In step S804, the control unit 1001 controls the speed Vn so as not to be lower than the rotational speed $V_{b2}$ different from the specific rotational speed $V_{a2}$ at which vibration is generated. However, the control unit 1001 may execute control so as to match the rotational speed $V_{b2}$ with the rotational speed $V_{a2}$.

In steps S804 and S806, the control unit 1001 uses the elapsed time $T_a$ or the like to calculate the speed Vn. However, by using a distance to the position designated by the client 3000, the control unit 1001 may calculate time until the speed Vn reaches the speed $V_{b1}$.

In steps S804 and S806, the control unit 1001 calculates the speed Vn. However, a speed detection unit such as a photointerrupter may be installed in a pan driving mechanism 1101 or the like to directly measure the speed.

In step S805, the control unit 1001 sets the acceleration to 0 to perform the uniform motion operation. However, when the speed drops due to friction or the like, the control unit 1001 may perform an operation of raising (increasing) the acceleration if necessary. In the present exemplary embodiment, the control unit 1001 corresponds to a control switching unit configured to control the acceleration causing the change of the imaging direction.

Figure 9:
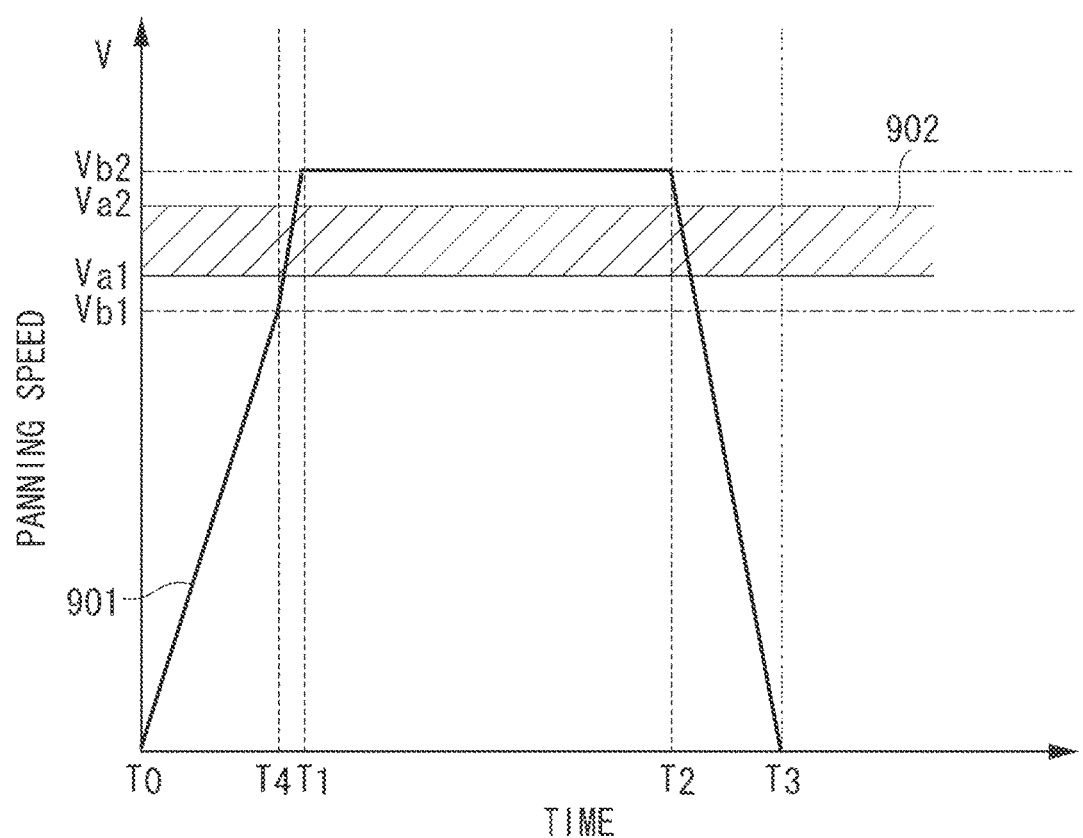
FIG. 9 is a graph illustrating an example of change in "speed" when the imaging direction of the imaging apparatus is changed according to the third exemplary embodiment of the present invention.

In FIG. 9, a solid line 901 indicates a speed change for rotating the image capturing unit 1003 in the panning direction. For example, the solid line 901 indicates a state of accelerating, from time T0 to time T4, the speed up to the speed $V_{b1}$ at acceleration α1. From the time T4 to the time T1, the solid line 901 indicates a state where the speed is accelerated to the speed $V_{b2}$ at acceleration α2. The acceleration α1 is larger than the acceleration α1.

Then, the solid line 901 indicates a state where the image capturing unit 1003 approaches a stop position, the speed for rotating the image capturing unit 1003 in the panning direction is reduced at acceleration −α2 from the time T2 to time T3, and the speed is 0 when the image capturing unit 1003 reaches the stop position.

In this way, even when the acceleration and the speed for changing the imaging direction is set by the user or the like, by the operation for controlling the speed according to the acceleration, the time required for suppressing generation of vibration at the imaging apparatus 1000 and operating the apparatus to the designated position in the imaging direction can be shortened.

Other Embodiments

The present invention can be achieved by executing the following processing. Software (program) for achieving the functions of the exemplary embodiments is provided to a system or an apparatus via a network or various types of computer-readable storage media. Then, a computer (CPU or microprocessor unit (MPU)) of the system or the apparatus reads and executes the computer program The exemplary embodiments of the present invention have been described above. However, the present invention is not limited to the exemplary embodiments. Various changes and modifications can be made within the gist of the invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105361, filed May 21, 2014, which is hereby incorporated by reference herein in its entirety.

What is claimed is:

1. An imaging apparatus capable of communicating with an external apparatus via a network, the imaging apparatus comprising:
    at least one processor communicate with a memory;
    an image recorder configured to capture an image of a subject;
    a rotator configured to rotate the image recorder in a predetermined direction;
    a reception unit configured to receive a control command including information for designating acceleration when the rotator rotates the image recorder;
    a first control unit configured to control the rotator at the acceleration designated by the control command;
    a second control unit configured to control the rotator at acceleration that is different from the acceleration designated by the control command;
    a determination unit configured to determine whether a speed at which the rotator rotates the image recorder is within a predetermined range equal to a range within which a speed, at which the image recorder vibrates, is included; and
    a control switcher configured to switch between the first control unit and the second control unit according to a determination result of the determination unit, and control the rotator,
    wherein the reception unit, the first control unit, the second control unit, and the determination unit are implemented by the at least one processor.

2. The imaging apparatus according to claim 1, further comprising a changing unit implemented by the at least one processor and configured to change the speed at which the rotator rotates the image recorder based on at least one of an installation position of the imaging apparatus, an installation posture of the imaging apparatus, and weight of the imaging apparatus.

3. The imaging apparatus according to claim 1,
    wherein the different acceleration has a value that is smaller than a value of the acceleration designated by the control command, and
    wherein, in a case where the speed when the rotator rotates the image recorder is equal to or lower than the predetermined range, the control switcher switches control of the rotator to control by the second control unit.

4. The imaging apparatus according to claim 1,
    wherein the different acceleration has a value that is larger than a value of the acceleration designated by the control command, and
    wherein, in a case where the speed when the rotator rotates the image recorder is within the predetermined range, the control switcher switches the control of the rotator to the control by the second control unit.

5. The imaging apparatus according to claim 1, wherein the determination unit is a first determination unit, the imaging apparatus further comprising a second determination unit implemented by the at least one processor and configured to determine whether the acceleration designated by the control command is larger than a predetermined acceleration,
    wherein, in a case where the second determination unit determines that the acceleration designated by the control command is larger than the predetermined acceleration and the first determination unit determines that the speed when the rotator rotates the image recorder is higher than the predetermined range, the control switcher switches control of the rotator to control by the second control unit.

6. The imaging apparatus according to claim 1, further comprising a transmission unit implemented by the at least one processor and configured to transmit, to the external apparatus, acceleration information indicating acceleration at which the imaging apparatus can operate,
    wherein the control command includes information for transmitting and instructing the acceleration information to the external apparatus.

7. The imaging apparatus according to claim 1, wherein at least one of (i) the imaging apparatus is a pan/tilt/zoom camera, (ii) the image recorder includes an image sensor to convert an optical image to an electronic signal, (iii) the rotator includes a stepping motor and a gear, and (iv) the control switcher is configured to control acceleration for changing imaging direction.

8. An imaging apparatus capable of communicating with an external apparatus via a network, the imaging apparatus comprising:
    at least one processor to communicate with a memory;
    an image recorder configured to capture an image of a subject;
    a rotator configured to rotate the image recorder in a predetermined direction;
    a reception unit configured to receive a control command including information for designating acceleration when the rotator rotates the image recorder;
    a first control unit configured to control the rotator at the acceleration designated by the control command;
    a second control unit configured to control the rotator at acceleration that is different from the acceleration designated by the control command;
    a determination unit configured to determine whether vibration generated when the rotator rotates the image recorder is within a predetermined range equal to a range within which a speed, at which the image recorder vibrates, is included; and
    a control switcher configured to switch between the first control unit and the second control unit according to a determination result of the determination unit, and control the rotator,
    wherein the reception unit, the first control unit, the second control unit, and the determination unit are implemented by the at least one processor.

9. The imaging apparatus according to claim 8, wherein at least one of (i) the imaging apparatus is a pan/tilt/zoom camera, (ii) the image recorder includes an image sensor, (iii) the rotator includes a stepping motor and a gear, and (iv) the control switcher is configured to control acceleration for changing imaging direction.

10. A method for controlling an imaging apparatus including an image recorder configured to capture an image of a subject and capable of communicating with an external apparatus via a network, the method comprising:

rotating the image recorder in a predetermined direction;

receiving a control command including information for designating acceleration when the image recorder is rotated;

controlling, as a first control, the rotating of the image recorder at the acceleration designated by the control command;

controlling, as a second control, the rotating of the image recorder at acceleration that is different from the acceleration designated by the control command;

determining whether a speed at which the image recorder is rotated is within a predetermined range equal to a range within which a speed, at which the image recorder vibrates, is included; and switching between the first control and the second control according to a determination result of the determining, and controlling the rotating of the image recorder.

11. The method according to claim 10, further comprising changing the speed at which the image recorder is rotated based on at least one of an installation position of the imaging apparatus, an installation posture of the imaging apparatus, and weight of the imaging apparatus.

12. The method according to claim 10, wherein the different acceleration has a value that is smaller than a value of the acceleration designated by the control command, and wherein, in a case where the speed when the image recorder is rotated is equal to or lower than the predetermined range, switching includes switching control of the rotator to control by the second control.

13. The method according to claim 10, wherein the different acceleration has a value that is larger than a value of the acceleration designated by the control command, and wherein, in a case where the speed when the image recorder is rotated is within the predetermined range, switching includes switching control of the rotator to the control by the second control.

14. The method according to claim 10, wherein the determining is a first determination, the method further comprising determining, as a second determination, whether the acceleration designated by the control command is larger than a predetermined acceleration, wherein, in a case where the second determination determines that the acceleration designated by the control command is larger than the predetermined acceleration and the first determination determines that the speed when the image recorder is rotated is higher than the predetermined range, switching includes switching control of the rotator to control by the second control.

15. The method according to claim 10, further comprising transmitting, to the external apparatus, acceleration information indicating acceleration at which the imaging apparatus can operate, wherein the control command includes information for transmitting and instructing the acceleration information to the external apparatus.

16. The method according to claim 10, wherein at least one of (i) the imaging apparatus is a pan/tilt/zoom camera, and (ii) switching includes controlling acceleration for changing imaging direction.

17. A non-transitory computer readable storage medium storing a computer program causing an imaging apparatus to execute the method according to claim 10.

18. The non-transitory computer readable storage medium according to claim 17, wherein the different acceleration has a value that is smaller than a value of the acceleration designated by the control command, and wherein, in a case where the speed when the image recorder is rotated is equal to or lower than the predetermined range, switching includes switching control of the rotator to control by the second control.

19. The non-transitory computer readable storage medium according to claim 17, wherein the different acceleration has a value that is larger than a value of the acceleration designated by the control command, and wherein, in a case where the speed when the image recorder is rotated is within the predetermined range, switching includes switching control of the rotator to the control by the second control.

20. The non-transitory computer readable storage medium according to claim 17, wherein at least one of (i) the imaging apparatus is a pan/tilt/zoom camera, and (ii) switching includes controlling acceleration for changing imaging direction.

* * * * *